(12) United States Patent
Endo (10) Patent No.: US 7,068,570 B2
(45) Date of Patent: Jun. 27, 2006

(54) REPRODUCING APPARATUS (75) Inventor: Satoshi Endo, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 458 days.

(21) Appl. No.: 10/398,879

(22) PCT Filed: Jul. 24, 2002

(86) PCT No.: PCT/JP02/07459

§ 371 (c)(1),
(2), (4) Date: Apr. 11, 2003

(87) PCT Pub. No.: WO03/010769

PCT Pub. Date: Feb. 6, 2003

(65) Prior Publication Data

US 2004/0022138 A1    Feb. 5, 2004

(30) Foreign Application Priority Data

Jul. 24, 2001  (JP) ............................ 2001-223106

(51) Int. Cl.
*G11B 7/85*   (2006.01)
*G11B 27/00*  (2006.01)

(52) U.S. Cl. ............... 369/30.1; 369/30.04; 369/47.39; 369/47.55; 369/59.25

(58) Field of Classification Search ............... 369/30.1, 369/30.05, 275.4, 47.1, 47.16, 47.21, 47.54, 369/53.19, 53.28, 53.41, 53.29, 30.04, 47.55, 369/47.39, 53.22, 53.24, 53.36, 53.31, 59.25; 707/200; 386/96, 111

See application file for complete search history.

(56) References Cited

U.S. PATENT DOCUMENTS

| 5,592,450 | A | * | 1/1997 | Yonemitsu et al. | ........... 386/96 |
| 5,661,715 | A | * | 8/1997 | Blaukovitsch | ........... 369/275.4 |
| 5,825,726 | A | * | 10/1998 | Hwang et al. | ........... 369/30.05 |
| 5,978,812 | A | * | 11/1999 | Inokuchi et al. | ........... 707/200 |
| 6,009,058 | A | * | 12/1999 | Sims et al. | ............... 369/53.28 |
| 6,243,340 | B1 | * | 6/2001 | Ito et al. | .................. 369/53.19 |
| 6,363,040 | B1 | * | 3/2002 | Murata | ...................... 369/47.1 |

FOREIGN PATENT DOCUMENTS

| JP | 5089643 | 4/1993 |
| JP | 6349252 | 12/1994 |
| JP | 8161754 | 6/1996 |
| JP | 10228754 | 8/1998 |
| JP | 11185391 | 7/1999 |

* cited by examiner

Primary Examiner—William Korzuch
Assistant Examiner—Kim-Kwok Chu
(74) Attorney, Agent, or Firm—RatnerPrestia (57) ABSTRACT A reproducing apparatus capable of reproducing the data to be reproduced correctly by judging the lead-in region of first session on a multi-session disc. The reproducing apparatus reproduces a multi-session disc composed of a plurality of sessions, each comprising a lead-in region recording index information including the information of reproduction start time measured from the disc innermost peripheral position, program region recording program tracks storing contents to be reproduced, and lead-out region, corresponding to the start position of each program track stored in the multi-session disc. This reproducing apparatus comprises an optical pickup for reading out the index information of specified session, and a session judging unit for judging if the lead-in region of the specified session is the lead-in region of the first session of the multi-session disc or not, on the basis of the information of the reproduction time included in the index information being read out by the optical pickup.

1 Claim, 10 Drawing Sheets

REPRODUCING APPARATUS

This application is a 371 of PCT/JP02/07459 Jul. 24, 2002.

BACKGROUND OF THE INVENTION

1. Technical Field

The present invention relates to reproduction of a disc on which information is recorded, and more particularly to a technology for accessing to the first session lead-in of a multi-session disc.

2. Background Art

A compact disc (hereinafter referred to as CD) was formerly sold in form of medium on which music data being recorded. Recently, multi-session disc known as CD-EXTRA is being sold in form of medium on which computer-readable data (video data, etc.) is recorded as well as music data.

At the same time, general consumers often record desired data on recordable recording media, that is, Compact Disc Recordable (hereinafter referred to as CD-R). Data can be recorded on the CD-R in various formats. Typical recordable formats of CD-R include music CD format such as CD-DA (Compact Disc-Digital audio), and data format such as CD-ROM (Compact Disc Read-Only Memory). A system for recording data on a CD-R is called "CD-R system", which is usually realized by providing a personal computer with a CD-R recorder.

Figure 6:
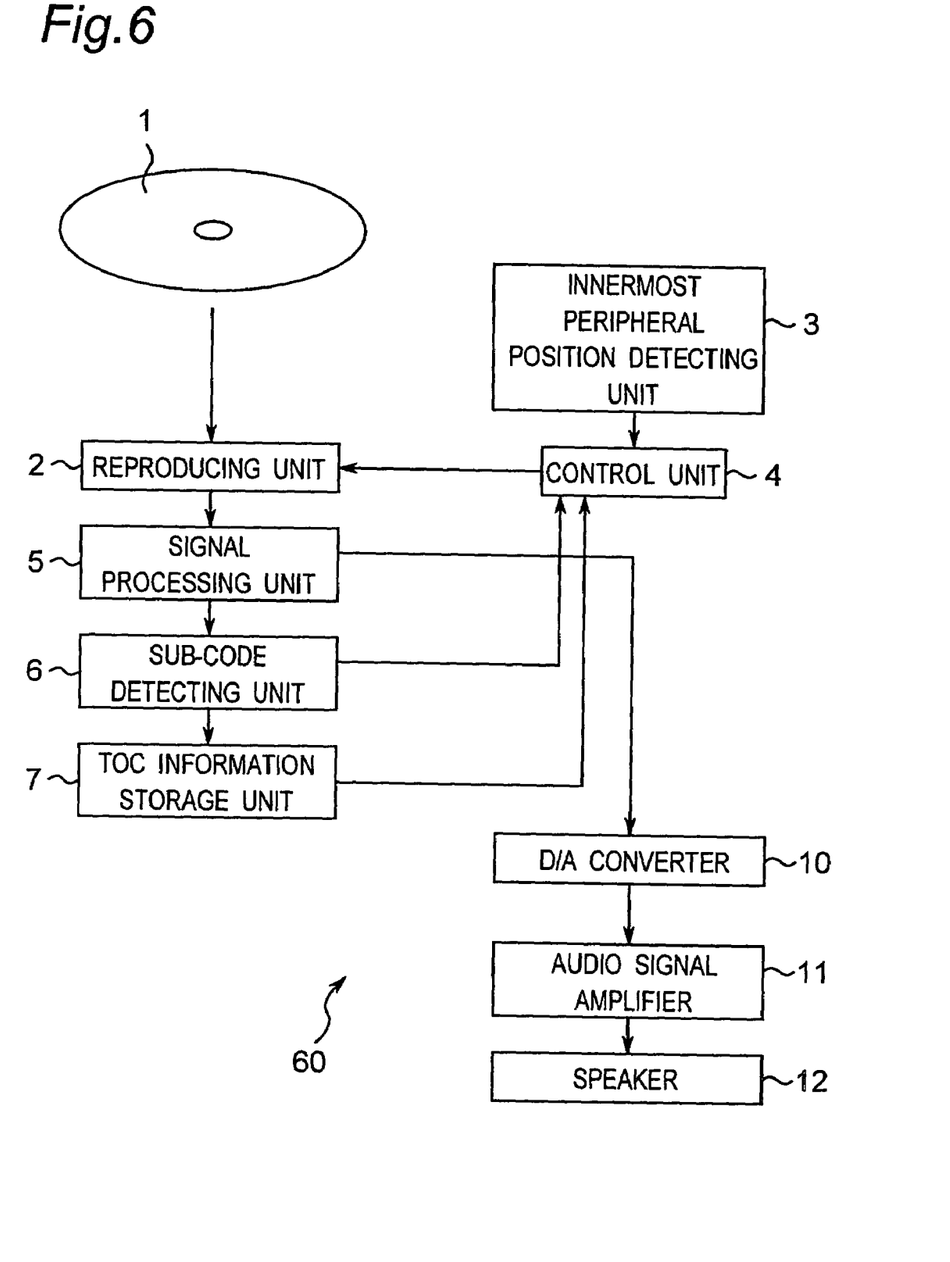
FIG. 6 is a block diagram of a conventional disc reproducing apparatus for reproducing a music CD-DA disc.

In the initial stage of CD, mainly the music CD-DA format was employed, wherein the data was recorded by single-session multi-track system. FIG. 6 is a block diagram of conventional disc reproducing apparatus 60 for reproducing a music CD-DA disc. A reproducing unit 2 for reproducing data from a disc is loaded with a disc 1 to be reproduced, and includes a pickup and other mechanical units for reproducing the data of the loaded disc 1.

Data signal from reproducing unit 2 is demodulated in a signal processing unit 5, decoded into analog music signal in a D/A converter 10, amplified into a sufficiently large electric signal in an audio signal amplifier 11, and is output from a speaker 12. A control unit 4 controls the general operation of the disc reproducing apparatus. In disc 1, table-of-contents information (hereinafter referred to as TOC information) is recorded as index information. To control the general operation of disc reproducing apparatus 60, control unit 4 reads out the TOC information from signal processing unit 5 through a sub-code detecting unit 6, and stores in a TOC information storage unit 7. Control unit 4 fetches start time information of the track to be reproduced from the TOC information upon reproducing disc 1, moves an optical pickup to this position, and reads out the music data signal. These operations are executed on the basis of processing of the program stored in control unit 4. Operation of control unit 4 is realized by using a so-called microcomputer, and TOC information storage unit 7 is a so-called random access memory (RAM).

Figure 7:
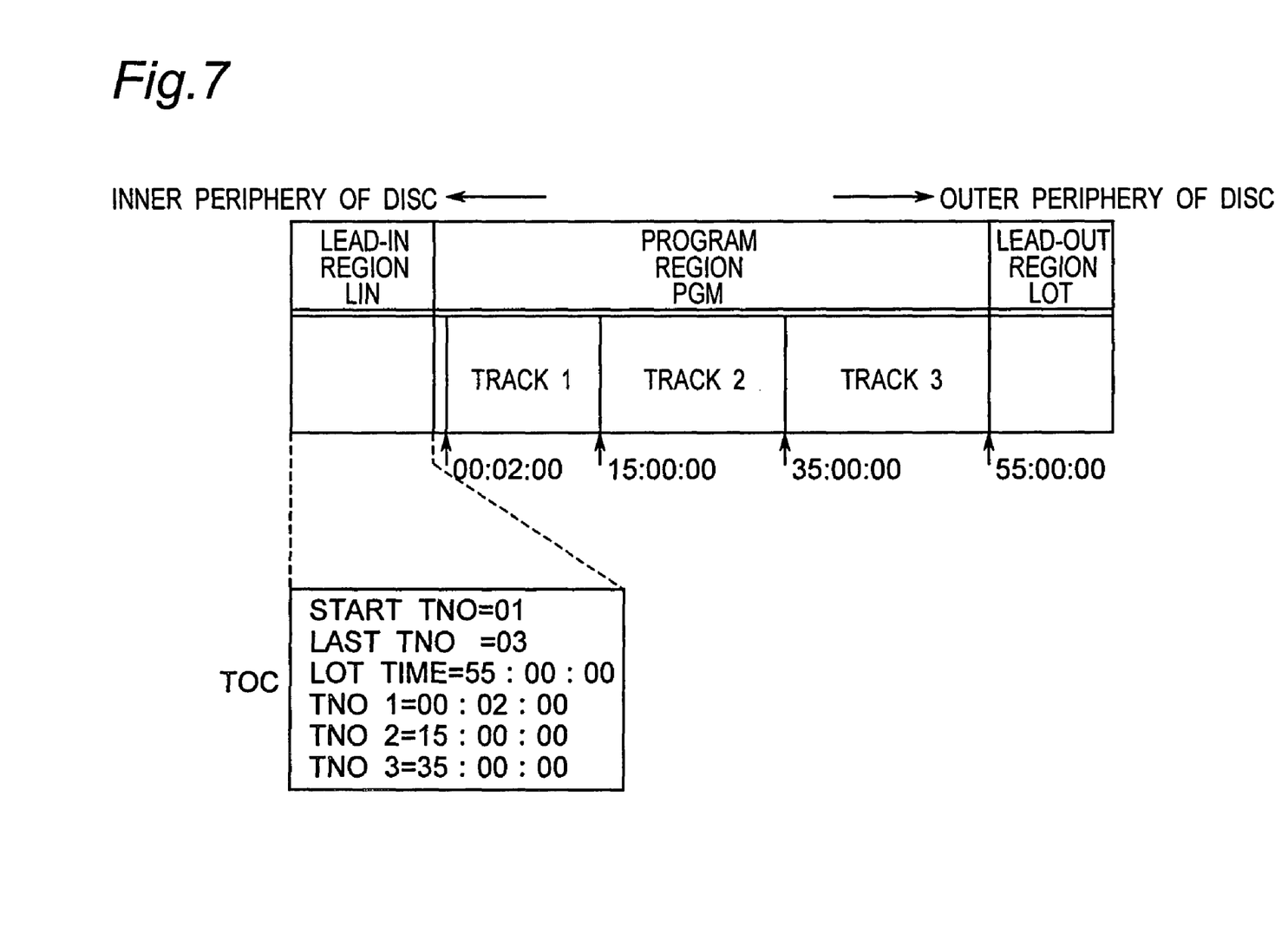
FIG. 7 shows a data layout of a disc recorded in a single session.

FIG. 7 shows a data layout example of a disc recorded in a single session. The disc region is roughly divided into a lead-in region LIN, a program region PGM, and a lead-out region LOT. The TOC information is recorded on lead-in region LIN at the inner peripheral side of the disc recorded in a single session.

Disc reproducing apparatus 60 (FIG. 6) first reads out the TOC information from disc 1, and displays the information about a certain track recorded on disc 1 in a display unit (not shown) such as liquid crystal display device, thereby urging the user to select a desired tune to be played. Therefore, when disc 1 is loaded into disc reproducing apparatus 60, in order to read the TOC information, disc reproducing apparatus 60 operates to move the pickup to lead-in region LIN.

For this operation, it is required that disc reproducing apparatus 60 recognizes the present pickup position. This operation is explained below.

Figure 2A:
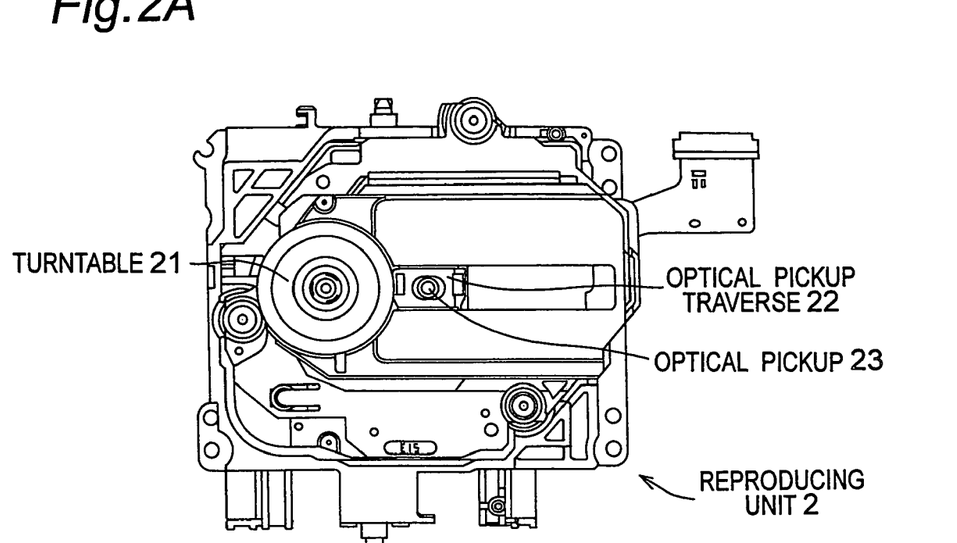
FIG. 2A to FIG. 2C are diagrams showing a structure of inexpensive mechanism.
Figure 2B:
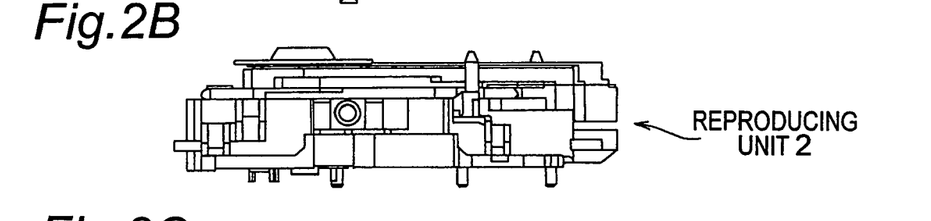
Figure 8:
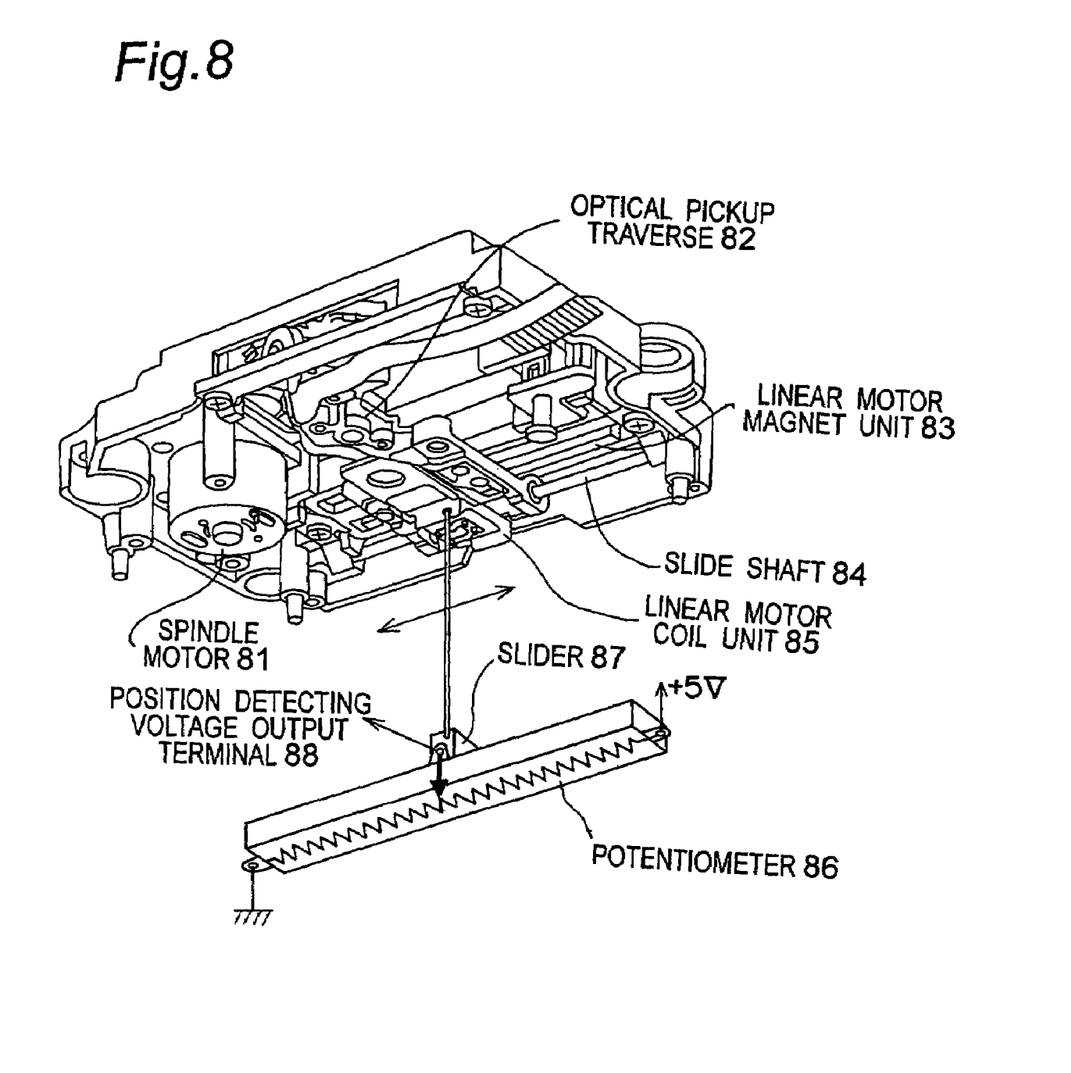
FIG. 8 shows a structure of expensive mechanism for conventional disc reproducing apparatus.

FIG. 8 shows a structure of an expensive mechanism of conventional disc reproducing apparatus 60. In the expensive mechanism of FIG. 8, from one end of a spindle motor 81 for rotating a turntable (not shown) on which disc 1 is placed, an optical pickup traverse 82 is designed to move by electromagnetic interaction generated between a linear motor magnet unit 83 and a linear motor coil unit 85. In this mechanism, a slider 87 is coupled to optical pickup traverse 82, and when optical pickup traverse 82 moves, slider 87 of a potentiometer 86 also moves. Therefore, the position detection voltage corresponding to the position of optical pickup traverse 82 is obtained from a position detection voltage output terminal 88. Thus, in this reproducing apparatus, the pickup position is always recognized by using the potentiometer, and high speed control is realized by using the linear motor as the driving motor. However, the cost is raised by using the potentiometer and linear motor, and hence a simplified mechanism is employed in disc reproducing apparatus 60 (FIG. 6). This is an inexpensive mechanism. For example, FIG. 2 shows a structure of inexpensive mechanism.

In the inexpensive mechanism, the expensive potentiometer is not used for detecting the position of optical pickup 23. Instead, in the inexpensive mechanism, an inexpensive push switch for detecting position (innermost peripheral position detecting switch 20), which is turned on only when optical pickup traverse 22 is positioned nearly in the innermost periphery of disc 1, is employed. Innermost peripheral position detecting switch 20 is connected to control unit 4 (FIG. 6) as innermost peripheral position detecting unit 3 (FIG. 6). Further, in the inexpensive mechanism, instead of the expensive linear motor, a brush type DC motor without speed control mechanism of same type as used in a cheap plastic model is used as traverse motor 24.

Disc 1 is mounted on turntable 21 and driven by a spindle motor 25. Optical pickup 23 is built in optical pickup traverse 22. When traverse motor 24 rotates, a traverse feed gear shaft 26 rotates, and optical pickup traverse 22 is guided by a slide shaft 27, and moves in a very tight state.

Operation of disc reproducing apparatus 60 (FIG. 6) of inexpensive mechanism (FIG. 2) for reproducing a commercial music audio CD is explained below. The music audio CD is a recorded disc of CD-DA by aluminum vapor deposition in a single session. In the inexpensive mechanism, the position of optical pickup 23 cannot be always recognized. Therefore, when loaded with music audio CD (CD-DA), disc reproducing apparatus 60 operates in a procedure as shown in FIG. 9 and FIG. 10.

Figure 9:
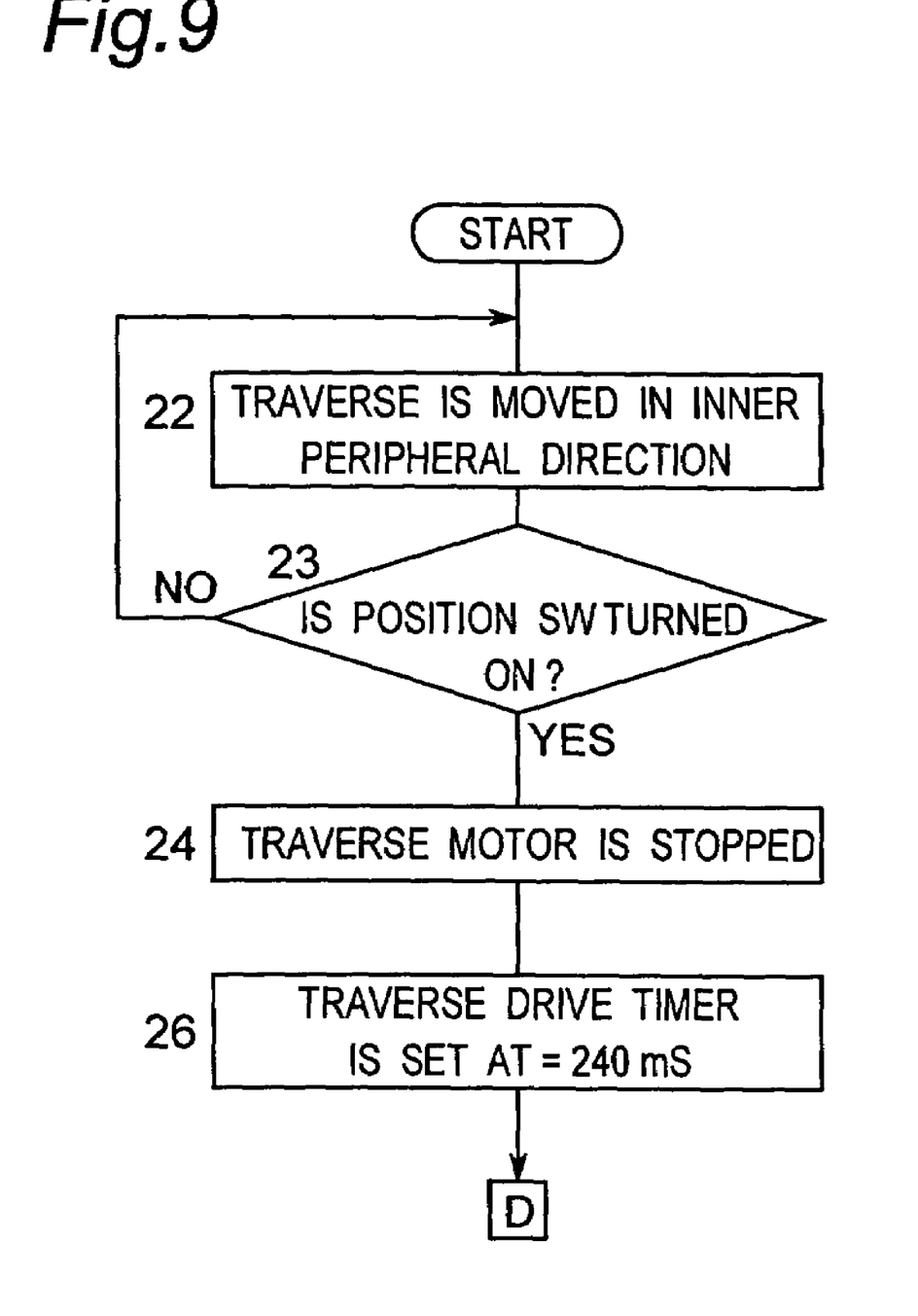
FIG. 9 is a flowchart showing operation of disc reproducing apparatus.

FIG. 9 and FIG. 10 are flowcharts showing operation of disc reproducing apparatus 60 (FIG. 6). Referring to FIG. 9, control unit 4 (FIG. 6) drives traverse motor 24 (FIG. 2) of inexpensive mechanism, and moves optical pickup traverse 22 (FIG. 2) in the direction of inner periphery (step 22). As a result, optical pickup traverse 22 (FIG. 2) is positioned on the almost innermost periphery of disc 1. When optical pickup traverse 23 (FIG. 2) is positioned on the almost innermost periphery of disc 1, innermost peripheral position detecting switch 20 is turned on, and it is detected (step 23). Consequently, control unit 4 (FIG. 6) stops traverse motor 24 (step 24), and sets the timer for determining the driving time of traverse timer 24 at 240 mS (step 26).

Figure 10:
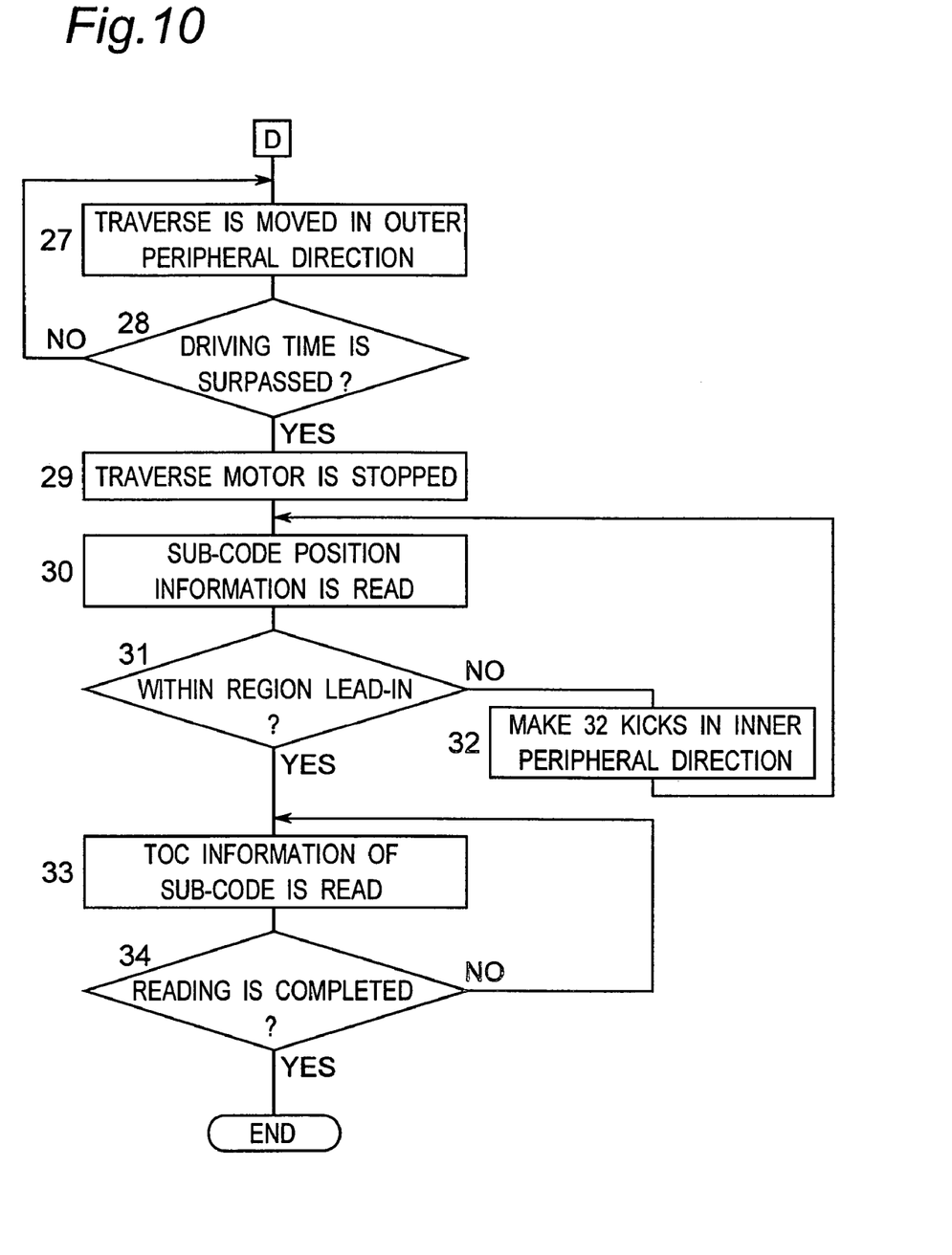
FIG. 10 is a flowchart showing operation of disc reproducing apparatus.

Referring next to FIG. 10, traverse motor 24 is driven in reverse direction (outer circumferential direction) (step 27). Judging whether surpassing the duration T of the timer (240 mS in this prior art) for determining the driving time of traverse motor 24 or not (step 28), traverse motor 24 continues to drive if not surpassing. If surpassing, traverse motor 24 is stopped (step 29). As a result, optical pickup 23 is moved at least to the outer circumferential position from the start position of lead-in LIN of disc 1.

Duration T is usually designed by selecting a value for moving to a considerably outer peripheral position from the start position of lead-in LIN, that is, in program region PGM. The reason is because a considerably safety allowance is needed from the aspect of fail-safe principle due to the following three causes. Of the three causes, (1) the ON position of innermost circumferential position detecting switch 20 varies depending on the mounting error (deviation of precision of screw fixing position) of innermost circumferential position detecting switch 20 on unit main body 28, or structural individual error of innermost circumferential position detecting switch 20, (2) the rotating speed varies due to fluctuation of supply voltage or individual difference of motor because brush type DC motor without speed control mechanism is used as traverse motor 24, and (3) the rotating speed is increased or decreased depending on ambient temperature. In conventional disc reproducing apparatus 60, the duration of T is set at T=240 mS so as to move to a position of about 3 minutes from end point of lead-in LIN at ordinary temperature by referring to sub-code information.

When optical pickup 23 is moved to position of about 3 minutes of sub-code information, it is required to access lead-in LIN in order to read TOC information next time. Herein, sub-code information is read again (step 30), and it is judged whether the present position is in lead-in region or not (step 31). The present position is in program region PGM, not in lead-in region, and hence the progress goes to No at step 31. Herein, 32 kicks are made in the direction of inner circumference (step 32). By repeating this process as many times as required, it is possible to access lead-in region LIN. Reaching within lead-in region LIN by detecting the sub-code, the pertinent TOC information is read (step 33), and it is judged if all necessary information is read or not (step 34). If judged to be Yes, reading of TOC information is completed, and the subsequent process is made, for example, part of TOC information is shown in the display unit (not shown) telling that three tunes are contained in the disc in total and that it takes about 55 minutes to reproduce them all.

Consequently, when the user manipulates reproduction by pressing, for example, PLAY key (not shown), the start position of the specified tune is acquired by referring to the TOC information, and by accessing this position, reproduction is started.

Disc reproducing apparatus 60 sometimes reproduced wrong data which is not originally a subject to be reproduced by mistake if the capacity of data stored in the first session is small in the case of reproduction of disc recorded in multiple sessions. The reason is that, owing to the small capacity of data stored in the first session, the access for reading the TOC information of the first session has surpassed the recorded portion of the first session to get into lead-in of another session. As a result, the TOC information of other session is read and stored. A radical reason of such malfunction is that most commercial music audio CDs are recorded in single session, not in multiple sessions, and other reason is that disc reproducing apparatus 60 is designed to reproduce single-session discs only.

Figure 3:
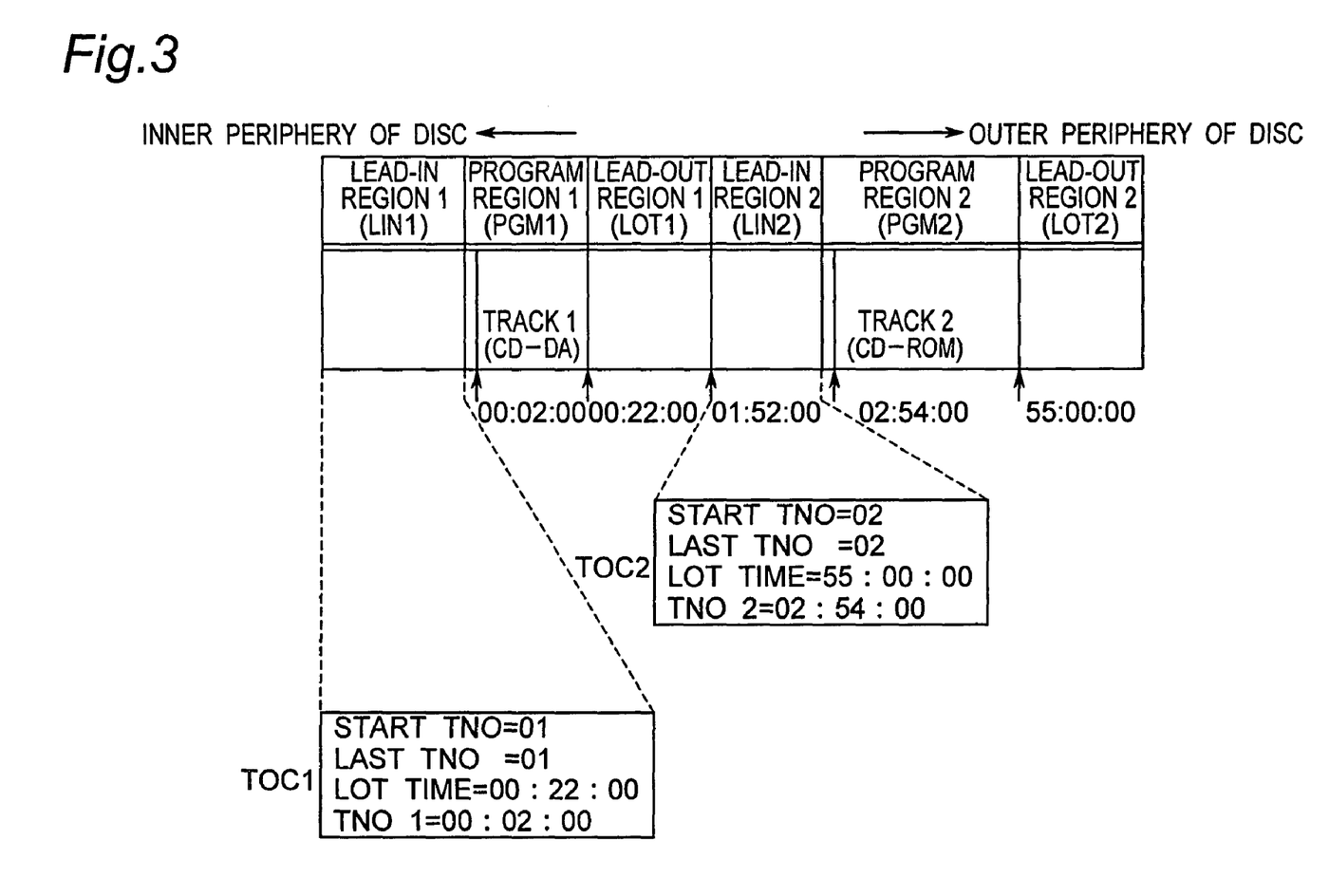
FIG. 3 shows a layout of a disc recorded in multiple sessions.

Referring now to FIG. 3, it is more specifically described. FIG. 3 shows a layout of a disc recorded in multiple sessions. Each session of multiple sessions is composed of lead-in region, program region and lead-out region, and a multiplicity of such sessions are recorded on a disc 1. FIG. 3 also shows an example of data included in the TOC information recorded on multi-session disc 1. As specified in the standard, the lead-in region of multiple sessions (after the second session) is 60 seconds, the lead-out region of multiple sessions is 30 seconds, and the lead-out region LOT1 of the first session is 90 seconds. Therefore, if program region PGM1 of first session is extremely short, for example, 0 second, the start position of program region PGM2 of second session is understood to be an absolute address position at least 2 minutes and 30 seconds later.

The operation of disc reproducing apparatus 60 for reproducing a multi-session disc so-called CD-EXTRA recorded in multiple sessions are described as follows. CD-EXTRA has a data composition as shown in FIG. 3. In this explanation, a short CD-DA tune of 20 seconds is recorded in the first session, and CD-ROM data is recorded in a second session.

When such disc 1 is loaded, as already explained by referring to FIG. 9 and FIG. 10, by moving optical pickup 23 in the inner peripheral direction of disc 1, when optical pickup 23 is positioned nearly on the innermost periphery of disc 1, traverse motor 24 is once stopped. Then moving for 240 mS in the outer circumferential direction, optical pickup 23 is moved to position of about 3 minutes of sub-code. Next, to read TOC information, it is attempted to access lead-in LIN1 of the first session.

In this example, a short CD-DA tune of 20 seconds is recorded in the first session, and CD-ROM data is recorded in the second session, and therefore lead-in region LIN2 of second session is present at the position of about 3 minutes of sub-code. Therefore, since optical pickup 23 is already positioned at second session lead-in LIN2 of disc 1, the TOC information is read directly in this state without executing 32 kicks operation in the inner circumferential direction at step 32. However, what is read is the TOC information of second session lead-in LIN2. Therefore, the display device (not shown) shows the information of second session, that is, part of TOC information (for example, total number of tunes of 1, and total reproduction time of about 52 minutes).

When the user manipulates to start reproduction by pressing, for example, PLAY key (not shown), disc reproducing apparatus 60 starts reproduction by referring to the stored TOC information. In this case, however, instead of the intended first session music (CD-DA), reproduction of CD-ROM data in the second session is started.

SUMMARY OF THE INVENTION

An object of the invention is to judge the lead-in region of first session on a multi-session disc, and reproduce the desired data correctly. It is other object of the invention to retry the access to the first session lead-in in case of getting into lead-in region of other session than the first session.

The reproducing apparatus of the invention is a reproducing apparatus for reproducing a multi-session disc composed of a plurality of sessions, each session comprising a lead-in region corresponding to the start position of each program track stored in the multi-session disc and recording index information including the information of reproduction start time measured from the disc innermost peripheral position, program region recording program tracks storing contents to be reproduced, and lead-out region, wherein said apparatus comprises an optical pickup for reading out the table-of-contents information of specified session, and a session judging unit for judging if the lead-in region of the specified session is the lead-in region of the first session of the multi-session disc or not, on the basis of the information of the reproduction time included in the index information being read out by the optical pickup.

According to the configuration of the invention, upon reading TOC information recorded on a disc, if the optical pickup surpasses the recorded data portion of the first session and gets into lead-in of other session, the access can be corrected to the lead-in of the first session by judging if it is the lead-in of the first session or not. Therefore, if the recorded data in the first session of the multi-session disc to be reproduced is extremely small in capacity, the TOC information necessary for reproduction can be read correctly. Since the TOC information can be read correctly, problems of access failure do not occur even in the case of reproduction of multi-session disc by using inexpensive position detecting push switch or brush type DC motor without speed control mechanism, so that an inexpensive reproducing apparatus can be realized.

The session judging unit may judge that the lead-in region of the specified session is the lead-in region of the first session when the reproduction start time of the first program track of the specified session is smaller than a specified value.

The session judging unit may judge that the lead-in region of the specified session is not the lead-in region of the first session when the reproduction start time of the first program track of the specified session is larger than a specified value.

The apparatus may further comprise an access retry unit for causing the optical pickup to access other session positioned at the inner periphery of the disc when the session judging unit judges that the lead-in region of the specified session is not the lead-in region of the first session.

On the basis of the access result by the access retry unit, the session judging unit may further judge if the lead-in region of the other session is the lead-in region of the first session of the multi-session disc or not.

Further comprising an innermost peripheral position detecting unit for detecting whether the optical pickup is present at the innermost peripheral position of the disc or not, the access retry unit may move the optical pickup into the inner peripheral direction of the disc, and as a result of detection by the innermost peripheral position detecting unit, when the optical pickup is judged to be positioned at the innermost periphery of the disc, the optical pickup may be moved to the other session away from the innermost peripheral position of the disc by a specified distance.

The access retry unit may decrease the moving distance gradually from the specified extent when moving the optical pickup repeatedly in the session of the inner periphery of the disc.

BRIEF DESCRIPTION OF THE DRAWINGS

Referring now to the accompanying drawings, an embodiment of the present invention is described in detail below.

DESCRIPTION OF THE PREFERRED EMBODIMENTS

Referring now to the accompanying drawings, an embodiment of the present invention is described in detail below. In the drawings, constituent elements having same functions are identified with same reference numerals.

Figure 1:
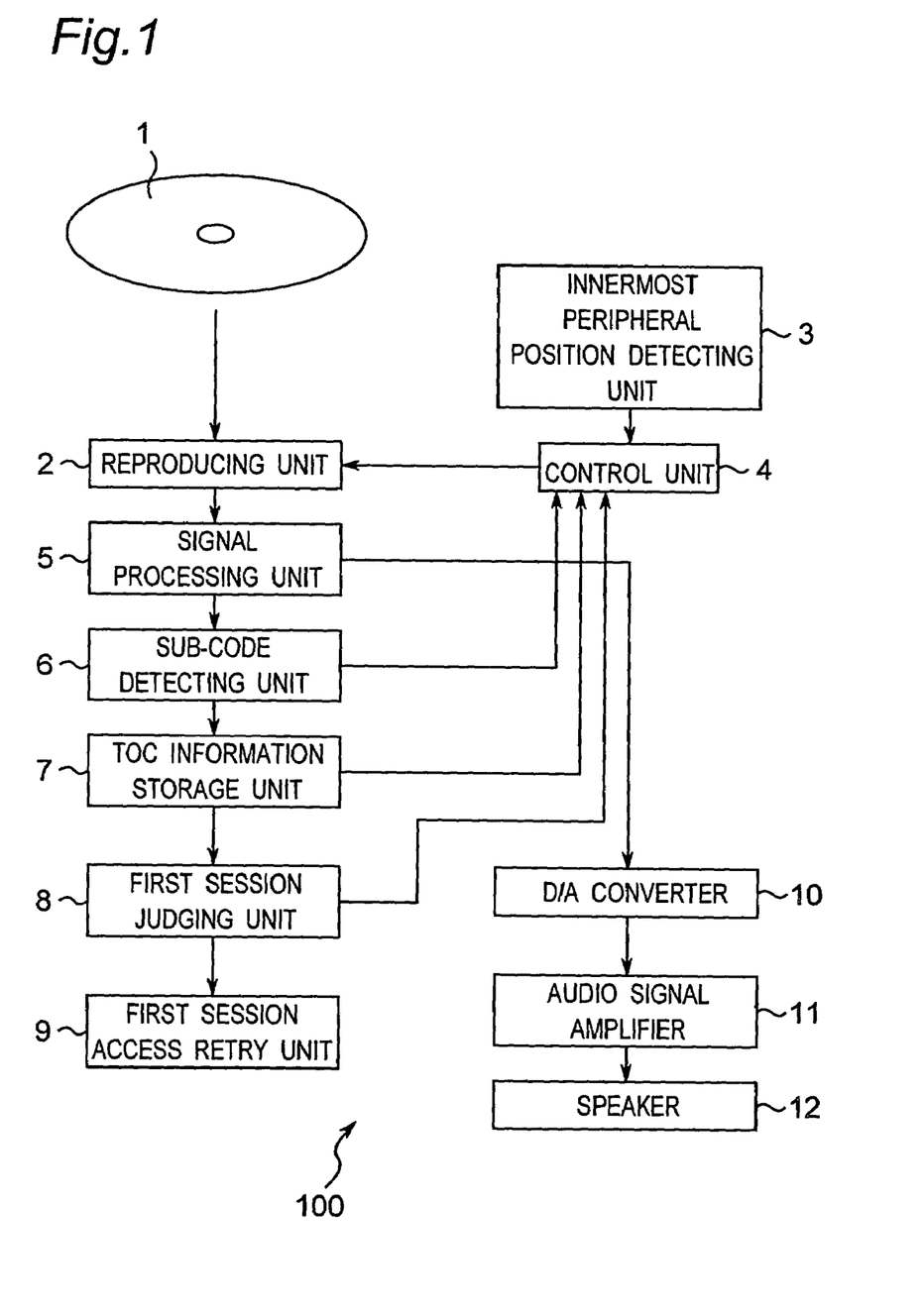
FIG. 1 is a block diagram of disc reproducing apparatus in an embodiment of the invention.

FIG. 1 is a block diagram of disc reproducing apparatus 100 in an embodiment of the invention. Disc reproducing apparatus 100 reproduces data recorded on a loaded disc 1. Disc 1 is a multi-session disc having plural sessions. The session is a recording unit composed of three recording regions, that is, a lead-in region, a program region, and a lead-out region. The program region of each session stores program tracks containing contents data (for example, music, video and/or data used in computer). Data used in computer includes CD-ROM data such as MP3 format compressing music signals. The lead-in region stores table-of-contents information (hereinafter referred to as TOC information) as index information for specifying the start position of the data (program track) recorded in the program region. The data start position is specified by the information of reproduction time in the case of ordinary reproduction from the disc innermost periphery or from a certain reference point. In disc 1, on the other hand, sub-code information capable of specifying the reproduction time when reproducing from the disc innermost periphery is recorded regularly. Disc reproducing apparatus 100 can specify the position corresponding to the reproduction start time from the disc innermost periphery indicated by the TOC information by using the sub-code information, and thereby can access a desired position. In this specification, the term "time" refers to the reproduction start position when reproduction is started from the innermost periphery of the disc or from the reference point. The sub-code information may include, not only the time, but also additional information such as tune number, index, time, and text. In this specification, in particular, the sub-code information capable of identifying the time is utilized.

Disc reproducing apparatus 100 comprises a reproducing unit 2, an innermost peripheral position detecting unit 3, a control unit 4, a signal processing unit 5, a sub-code detecting unit 6, a TOC information storage unit 7, a first session judging unit 8, a first session access retry unit 9, a D/A converter 10, an audio signal amplifier 11, and a speaker 12.

The constituent elements of disc reproducing apparatus 100 are explained below. Reproducing unit 2 is loaded with a disc 1 to be reproduced, and comprises mechanical units such as a pickup for reproducing the data of the loaded disc 1. In this embodiment, reproducing unit 2 is realized by a mechanism (inexpensive mechanism) shown in FIG. 2. The inexpensive mechanism employs an inexpensive push switch for detecting position (innermost peripheral position detecting switch 20) which is turned on only when an optical pickup traverse 22 is located nearly in the innermost peripheral area. Innermost peripheral position detecting switch 20 is connected to control unit 4 (FIG. 1) as innermost peripheral position detecting unit 3 (FIG. 1). In this inexpensive mechanism, instead of the expensive linear motor, a brush type DC motor without speed control mechanism of same type as used in a cheap plastic model is used as traverse motor 24.

Figure 2C:
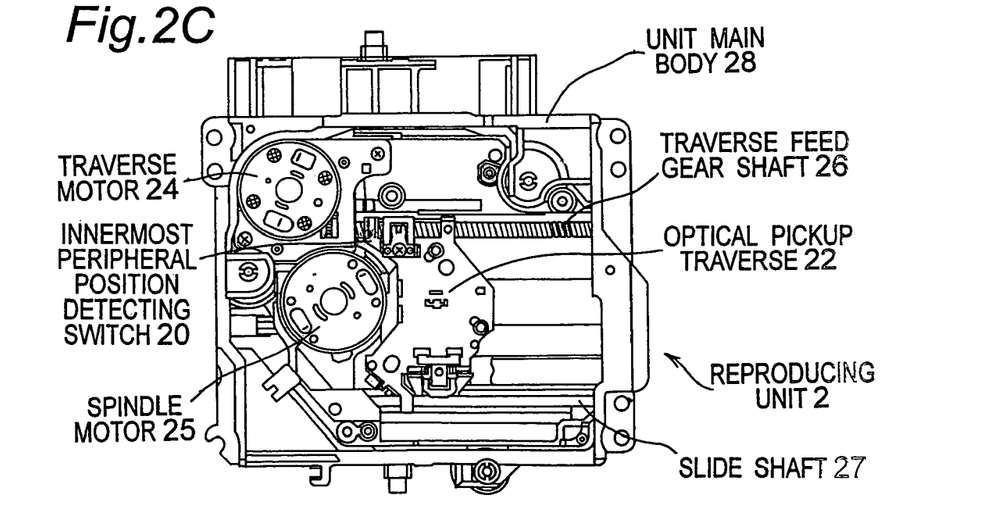

Disc 1 is put on a turntable 21, and is driven by a spindle motor 25 shown in (c) in FIG. 2. An optical pickup 23 is incorporated in optical pickup traverse 22. That is, when optical pickup traverse 22 is moved, optical pickup 23 is also moved. When traverse motor 24 rotates, a traverse feed gear shaft 26 rotates, and optical pickup traverse 22 is guided by a slide shaft 27, and moves in a very tight state.

By such basic operation, reproducing unit 2 (FIG. 1) generates a reproduction signal by reproducing the data of the loaded disc 1. Herein, "reproduction" does not mean recomposition of data into a state to be directly appreciated by the user, but it means to fetch data recorded on disc 1 on the basis of the pit information or the like of disc 1. Innermost peripheral position detecting unit 3 detects the innermost peripheral position of disc 1, and sends the result of detection to control unit 4.

Signal processing unit 5 demodulates the reproduction signal from reproducing unit 2 as digital reproduction data signal. When the reproduction data signal is a music data signal, D/A converter 10 decodes the digital reproduction signal from reproducing unit into an analog music signal. Audio signal amplifier 11 amplifies the analog music signal converted by the D/A converter 10 into a sufficiently large electrical signal, and delivers through speaker 12. When the reproduction data signal is other than music data signal, image or the like is displayed according to the signal, or sent into a memory of computer or the like as data to be used in computer.

Control unit 4 control general operation of disc reproducing apparatus 100. Explaining the operation in access time, control unit 4 reads out TOC information from signal processing unit 5, and stores in TOC information storage unit 7 (so-called random access memory or RAM). Using the stored TOC information, control unit 4 fetches time information showing the time of the track to be reproduced. To access the data of the time indicated by the time information, the sub-code information recorded on disc 1 is utilized. Specifically, control unit 4 reads the sub-code information at the present position of optical pickup 23 (FIG. 2(*a*)); and compares time ta indicated by the sub-code information and time tb indicated by the time information. If time ta<time tb, control unit 4 moves optical pickup 23 to outer side. If time ta>time tb, control unit 4 moves optical pickup 23 to inner side. By repeating this operation, when reaching the state of time ta=time tb, this position is the reproduction start position. Control unit 4 reads out the data at this position. These operations are executed according to the process of the program stored in control unit 4. Operation of control unit 4 is realized by using so-called microcomputer.

First session judging unit 8 judges whether the lead-in region reached by access operation is the lead-in region of the beginning session (first session) of the disc or not. Specifically, depending on whether the reproduction start time of the first program track in that session indicated by the TOC information in the lead-in region reached by the access operation is within a specified value or not, it is judged whether the pertinent lead-in region is the lead-in region of the beginning session (first session) of the disc or not. The "specified value" is 1 minute in this specification. When first session judging unit 8 judges that this region is not the lead-in region of the first session, first session access retry unit 9 moves the optical pickup again to the innermost peripheral position of the disc. The subsequent moving time of the optical pickup in the direction of the outer periphery is changed to a shorter time than the moving time of the first access operation, and the optical pickup is moved again, aiming at the first session, and the access operation is repeated. On the other hand, when first session judging unit 8 judges that this region is the lead-in region of the first session, control unit 4 has the optical pickup continuing the access to the region to read out data.

Figure 4:
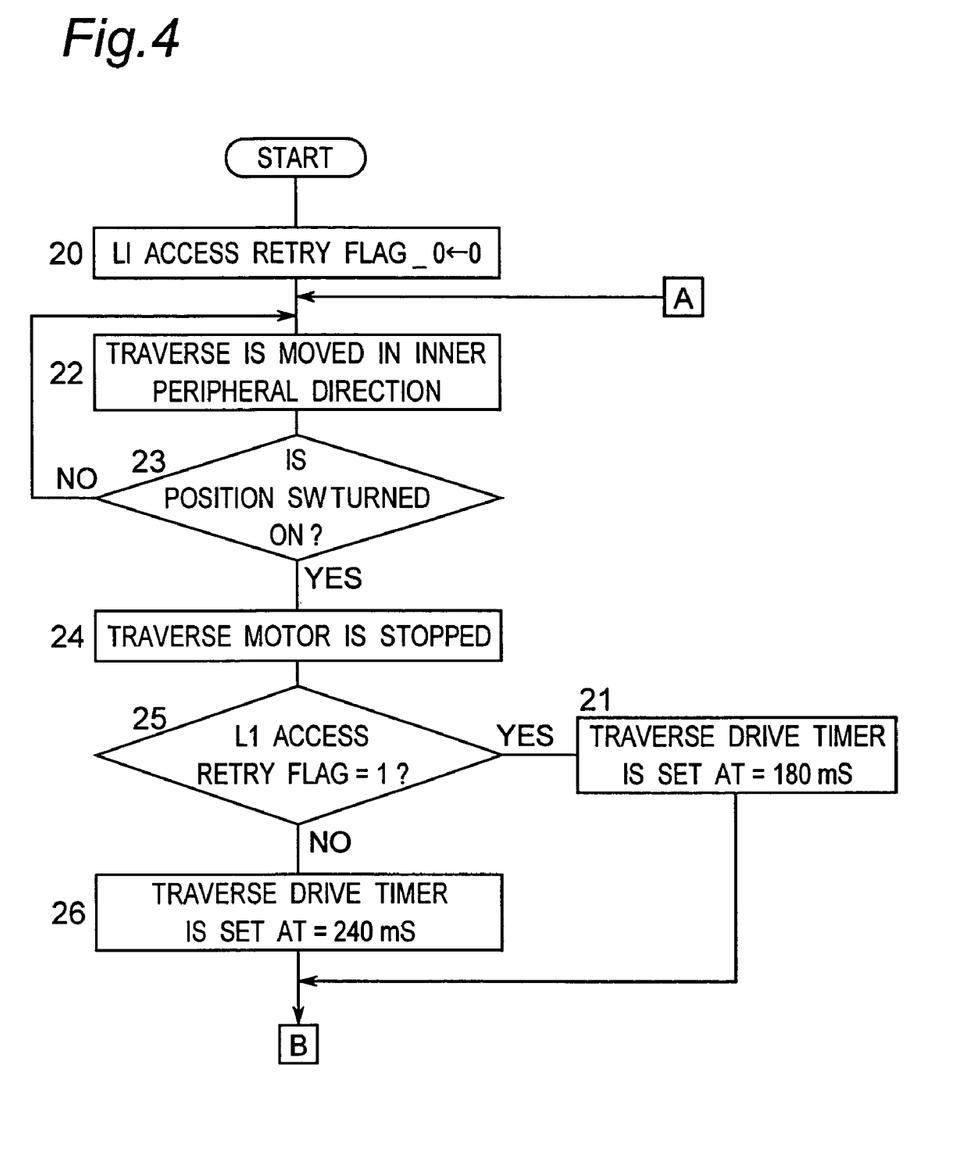
FIG. 4 is a flowchart showing operation of disc reproducing apparatus.
Figure 5:
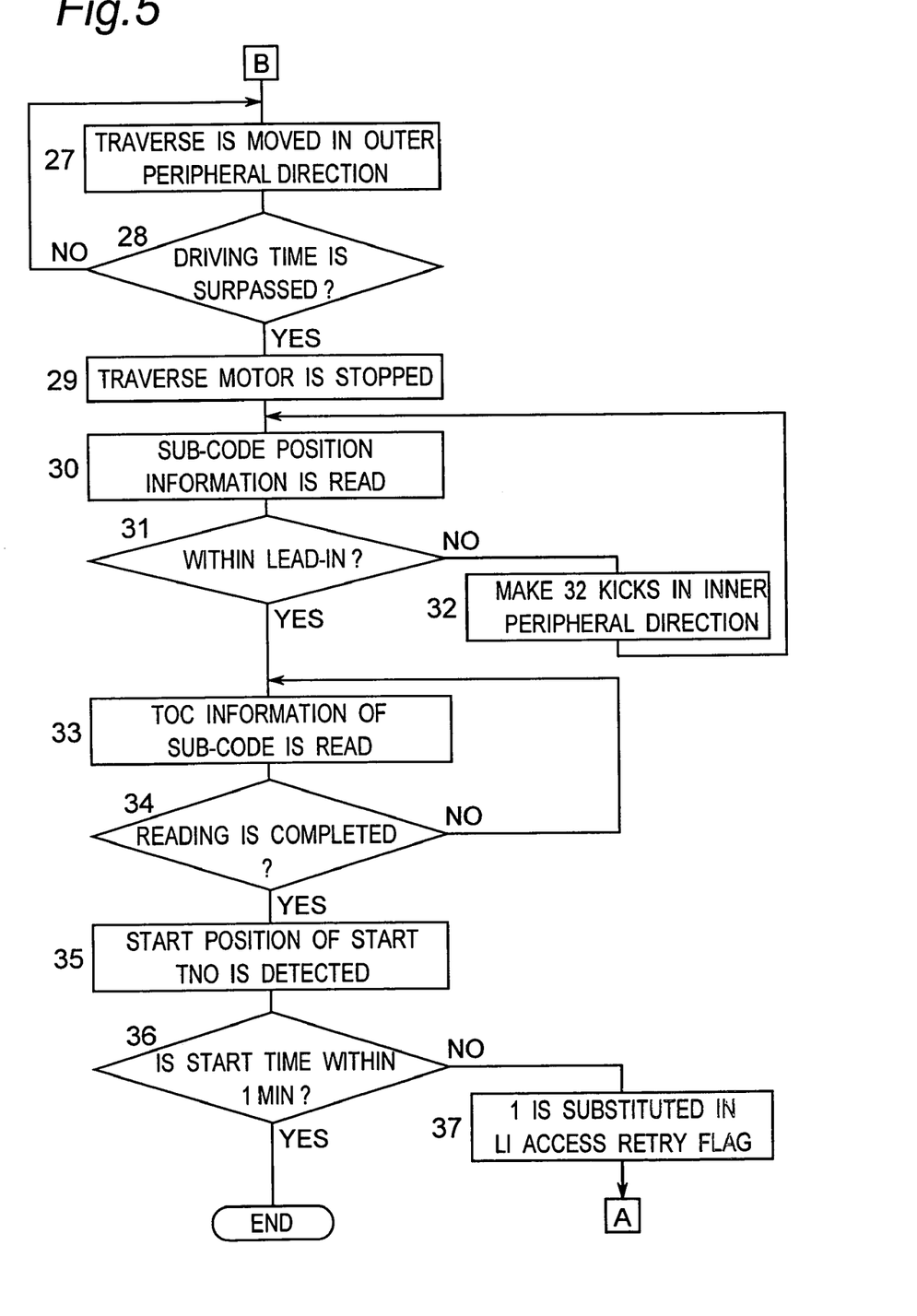
FIG. 5 is a flowchart showing operation of disc reproducing apparatus.

Operation of disc reproducing apparatus 100 (FIG. 1) is explained. Disc reproducing apparatus 100 (FIG. 1) reproduces a disc (for example, CD-EXTRA) having a data layout as shown in FIG. 3. FIG. 3 shows a data layout of a disc recorded in multiple sessions. In this example, a short 20-second CD-DA data tune is recorded in the first session, and CD-ROM data is recorded in a second session. As clear from the diagram, TOC information 1 about CD-DA data of track 1 is recorded in lead-in region 1 (LIN1), and TOC information 2 about CD-ROM data of track 2 is recorded in lead-in region 2 (LIN2). FIG. 4 and FIG. 5 are flowcharts showing operation of disc reproducing apparatus 100 (FIG. 1). Referring to FIG. 4, when disc 1 is loaded, LI access retry flag is cleared to 0 as first data initialization operation (step 20). Detail of LI access retry flag is explained below.

When disc 1 is loaded, in the inexpensive mechanism shown in FIG. 2, the position of optical pickup 23 cannot be always recognized. Accordingly, control unit 4 (FIG. 1) firstly drives traverse motor 24 of the inexpensive mechanism, and moves optical pickup traverse 22 in the direction of inner periphery (step 22). As a result, optical pickup traverse 22 (FIG. 2) is positioned nearly on the innermost periphery of disc 1. When optical pickup 23 (FIG. 2) nearly comes to the inner periphery of the disc 1, innermost peripheral position detecting switch 20 is turned on, and it is detected (step 23). As a result, control unit 4 (FIG. 6) stops traverse motor 24 (step 24), and it is judged whether the LI access retry flag is 1 or not (step 25). In the initial operation, the LI access retry flag is 0. Hence, the timer for determining the driving time of traverse motor 24 is set at 240 mS (step 26). The operation at step 21 is described later.

Referring next to FIG. 5, traverse motor 24 is driven in reverse direction (in the direction of outer periphery) (step 27). Judging if surpassing or not the timer duration T (T=240 mS in this embodiment) for determining the driving time of traverse motor 24 (step 28), if not surpassing yet, traverse motor 24 is driven continuously. If surpassing, traverse motor 24 is stopped (step 29). As a result, optical pickup 23 could be moved to an outer circumferential position at least from start position of lead-in LIN of disc 1. In disc reproducing apparatus 100 (FIG. 1), when set at T=240 mS, the position is moved from the end point of lead-in LIN at ordinary temperature to a position of about 3 minutes of the time indicated by sub-code information. When optical pickup 23 is moved to the position, it is required to access lead-in LIN in order to read TOC information next time. Reading again the sub-code information (step 30), it is judged whether the present position is within lead-in region or not (step 31).

As shown in FIG. 3, a short 20-second CD-DA data tune is recorded in the first session of this disc, and CD-ROM data is recorded in the second session. Therefore, at the position of about 3 minutes of sub-code information, lead-in region 2 (LIN2) of second session is present. At the present, since optical pickup 23 is positioned in lead-in region 2 (LIN2) of the second session, reading of TOC information (TOC2) of lead-in region 2 (LIN2) of the second session is started (step 33), and reading is completed (step 34). That is, operation of making 32 kicks is not executed in the direction of inner periphery at step 32.

Control unit 4 (FIG. 1) detects START TNO (beginning program track number of the session) of the session from the read TOC information (TOC2), and detects the start position of the beginning track (step 35). As a result of detection, control unit 4 (FIG. 1) judges whether the track start time is within 1 minute or not from initial reproduction of the disc (step 36). If within 1 minute, the read TOC information is judged to be the information of lead-in of the first session (step 36). In this example, the accessed session is a second session, and the value of 2 minutes and 45 seconds is obtained for its lead-in region 2 (LIN2), and hence it is judged that the start time is not within 1 minute (step 36). That is, it is not judged to be the first session. This limit of "within 1 minute" is determined because the second session does not exist at position of the time of about 1 minute in the format of multi-session disc. Later, 1 is set in the LI access retry flag (step 37), and the process returns to step 22 (FIG. 4).

Referring again to FIG. 4, control unit 4 (FIG. 1) drives traverse motor 24 to move optical pickup traverse 22 in the direction of inner periphery (step 22), and optical pickup traverse 22 is positioned nearly on the innermost periphery of disc 1. When the optical pickup comes nearly to the innermost periphery of the disc, innermost peripheral position detecting switch 60 is turned on. When it is detected that position detecting switch 20 is turned on (step 23), traverse motor 24 is stopped (step 24), and it is judged whether the LI access retry flag is 1 or not (step 25).

At the present, the LI access retry flag is 1, and the timer for determining the driving time of traverse motor 24 is set at 180 mS (step 21). Referring again to FIG. 5, traverse motor 24 is driven in reverse direction (in the direction of outer periphery) (step 27). Judging if surpassing or not the timer duration T (180 mS in this case) for determining the driving time of traverse motor 24 (step 28), if not surpassed yet, traverse motor 24 is driven continuously. If surpassed, traverse motor 24 is stopped (step 29). As a result, optical pickup 23 is moved to an outer circumferential position at least from start position of lead-in LIN of session 1.

In the embodiment, when traverse motor 24 is driven for 180 mS, optical pickup 23 is moved to a position corresponding to about 1 minute before of sub-code. By the move of optical pickup 23, since optical pickup 23 is positioned in a session before (at inner side) of lead-in region 2 (LIN2) of the second session of disc 1, operation of making 32 kicks is executed in the direction of inner periphery (step 32), and reading of TOC information 1 is completed by accessing the lead-in region 1 (LIN1) of the first session.

Control unit 4 (FIG. 1) detects START TNO of the session from the read TOC information (TOC1), and detects the start time corresponding to the start absolute address value of the TNO (step 35). As a result of detection, control unit 4 (FIG. 1) judges whether the reproduction start time of the track is within 1 minute or not from initial reproduction of the disc (step 36). If within 1 minute, the read TOC information is judged to be the information of lead-in of the first session (step 36). In this example, the actually accessed session is the TOC information (TOC1) of lead-in region of first session, and the value of 0 minute and 2 seconds is obtained for the start time of the beginning track (TNO1), and hence the start time is judged to be within 1 minute (step 36). That is, it is accurately judged to be the first session. A display device (not shown) shows the information of the first session (total number of tunes: 1, total reproduction time: 20 seconds) which is part of TOC information 1.

When the user manipulates to start reproduction by pressing PLAY key (not shown) or the like, disc reproducing apparatus 60 refers to the stored TOC information 1, and investigates the start time of a designated tune, and accesses correctly the position corresponding to the time, thereby starts reproduction.

At step 36 explained above, START TNO of the session is detected on the basis of the information in the lead-in, and it is judged whether it is the lead-in of the first session or not by seeing if the start time of the TNO shows a position of within 1 minute from start of reproduction of the disc or not. But this value is arbitrary, as far as it is between 3 seconds or more and less than 2 minutes and 35 seconds.

The invention comprises first session judging unit 8 for judging whether lead-in region of first session or not. However, by detecting the START TNO of the session on the basis of the information in the lead-in, if the start time of TNO is more than a certain value (for example, 4 seconds), it may be judged to be information of lead-in after the second session, so that that the access may be retried on lead-in of the first session.

In the specification, the driving time of the traverse motor for retry on the lead-in of the first session is explained as 240 mS and 180 mS only. But these values may be freely selected depending on the mechanism, and the number of times of retry may be set at a desired value. For example, when retrying repeatedly, by gradually decreasing the driving time, for example, 240 mS, 180 mS, 150 mS, 120 mS, the moving distance of the optical pickup can be also decreased gradually.

The invention claimed is:

1. A reproducing apparatus for reproducing a multi-session disc composed of a plurality of sessions, each session comprising a lead-in region corresponding to the start position of each program track stored in the multi-session disc and recording index information including the information of reproduction start time measured from the disc innermost peripheral position, program region recording program tracks storing contents to be reproduced, and lead-out region, comprising:

an optical pickup for reading out the index information of specified session;

a session judging unit for judging if the lead-in region of the specified session is the lead-in region of the first session of the multi-session disc or not, on the basis of the information of the reproduction time included in the index information being read out by the optical pickup;

wherein the session judging unit judges that the lead-in region of the specified session is not the lead-in region of the first session when the reproduction start time of the first program track of the specified session is larger than a specified value;

further comprising an access retry unit for having the optical pickup accessing other session positioned at the inner periphery of the disc when the session judging unit judges that the lead-in region of the specified session is not the lead-in region of the first session;

wherein the optical pickup further comprises an innermost peripheral position detecting unit for detecting whether the optical pickup is present at the innermost peripheral position of the disc or not, and wherein the access retry unit decreases the moving distance gradually from the specified extent when moving the optical pickup repeatedly in the session of the inner periphery of the disc.

* * * * *